United States Patent
Thompson et al.

(10) Patent No.: US 11,195,031 B2
(45) Date of Patent: Dec. 7, 2021

(54) METHOD OF DETERMINING THE BOUNDARY OF A DRIVEABLE SPACE

(71) Applicant: TRW LIMITED, Solihull (GB)

(72) Inventors: Martin John Thompson, Solihull (GB); Adam John Heenan, Chesterfield (GB); Oliver Payne, Droitwich (GB); Stephen Crumpler, Birmingham (GB)

(73) Assignee: ZF Automotive UK Limited, Solihul (GB)

( * ) Notice: Subject to any disclaimer, the term of this patent is extended or adjusted under 35 U.S.C. 154(b) by 105 days.

(21) Appl. No.: 16/470,423

(22) PCT Filed: Dec. 15, 2017

(86) PCT No.: PCT/GB2017/053770
§ 371 (c)(1),
(2) Date: Jun. 17, 2019

(87) PCT Pub. No.: WO2018/109498
PCT Pub. Date: Jun. 21, 2018

(65) Prior Publication Data
US 2020/0012867 A1    Jan. 9, 2020

(30) Foreign Application Priority Data
Dec. 16, 2016    (GB) .................................... 1621438

(51) Int. Cl.
*G06K 9/00*    (2006.01)
*G06T 7/90*    (2017.01)
(Continued)

(52) U.S. Cl.
CPC ....... *G06K 9/00805* (2013.01); *G06K 9/4642* (2013.01); *G06K 9/6267* (2013.01);
(Continued)

(58) Field of Classification Search
CPC .... G06K 9/00791; G06K 9/798; G06K 9/812; G06K 9/4642; G06T 7/90
See application file for complete search history.

(56) References Cited

U.S. PATENT DOCUMENTS 6,941,287 B1 *    9/2005    Vaidyanathan ...... G06K 9/6229
706/12
2009/0136125 A1 *    5/2009    Fujita .................. G06K 9/00805
382/165

(Continued)

FOREIGN PATENT DOCUMENTS

CN    103514444    1/2014

OTHER PUBLICATIONS

NPL No. 1 "Infrared Physics & Technology" (2013) pp. 288-299.
(Continued)

*Primary Examiner* — Wen W Huang
(74) *Attorney, Agent, or Firm* — Tarolli, Sundheim, Covell & Tummino LLP

(57) ABSTRACT

A method of determining the boundary of a driveable space in a scene around a vehicle, comprises capturing a first colour image of the scene, computing a set of histograms of oriented gradients, for instance using a HOG algorithm, each histogram corresponding to a cell in a set of cells, assigning an entropy value to the cell by computing the entropy of the histogram for the cell, dividing the image into bins in a way that corresponds to a rectangular grid in the real world, and calculating an overall entropy value for each bin from the entropy values for the cells in the bin and an overall colour characteristic value for each bin. The entropy value and colour characteristic value for each bin are fed into a classifier that is configured to classify regions of the image (Continued)

corresponding to each bin as regions likely to be driveable space or that are not likely to be driveable space, from which the boundary is derived.

9 Claims, 3 Drawing Sheets

(51) Int. Cl.
    *G06K 9/46*     (2006.01)
    *G06K 9/62*     (2006.01)
    *G06T 9/00*     (2006.01)

(52) U.S. Cl.
    CPC .................. *G06T 7/90* (2017.01); *G06T 9/00* (2013.01); *G06T 2200/24* (2013.01); *G06T 2207/10024* (2013.01); *G06T 2207/30248* (2013.01)

(56) References Cited

U.S. PATENT DOCUMENTS

| | | | | |
|---|---|---|---|---|
| 2010/0289632 | A1* | 11/2010 | Seder | G02B 27/01 340/436 |
| 2012/0075440 | A1* | 3/2012 | Ahuja | G06T 7/143 348/61 |
| 2013/0058535 | A1 | 3/2013 | Othmezouri et al. | |
| 2013/0258107 | A1* | 10/2013 | Delibaltov | G08G 1/065 348/148 |
| 2013/0342694 | A1* | 12/2013 | Friedhoff | G06K 9/00791 348/148 |
| 2014/0270479 | A1* | 9/2014 | Berestov | G06T 7/13 382/154 |
| 2014/0343842 | A1* | 11/2014 | Ranganathan | G01C 21/30 701/472 |
| 2016/0267331 | A1* | 9/2016 | Pillai | G06K 9/00805 |
| 2016/0300360 | A1* | 10/2016 | Ariga | G06T 7/11 |
| 2016/0307054 | A1* | 10/2016 | Takemura | H04N 5/2171 |
| 2016/0342848 | A1* | 11/2016 | Seki | G01M 5/0033 |
| 2017/0161569 | A1* | 6/2017 | Ren | G08G 1/16 |

OTHER PUBLICATIONS

NPL No. 2 "IET Intelligent Transport Sys, the Institution of Engineering and Technology" (Nov. 2016) pp. 594-604.

NPL No. 3 "2nd International Conference on Computer Science and Network Technology", (2012) pp. 20-24.

NPL No. 4 "IEEE International Conference on Intelligent Vehicles" (Jan. 1998) pp. 143-148.

* cited by examiner

METHOD OF DETERMINING THE BOUNDARY OF A DRIVEABLE SPACE

RELATED APPLICATION

This application corresponds to PCT/GB2017/053770, filed Dec. 15, 2017, which corresponds to British Application No. 1621438.9, filed Dec. 16, 2016, the subject matter, of which are incorporated herein by reference in their entirety.

This invention relates to image processing, and in particular to a method of processing an image to determine the characteristics of regions of space around a vehicle, in particular identifying the boundary of a driveable space into which a vehicle may move.

When driving a vehicle on a highway or off-road, it is essential that the driver of the vehicle is able to avoid hitting other objects or driving onto a surface which cannot safely be driven on. Examples of typical objects in a road environment are other cars and walls and street furniture. Examples of surfaces on which a vehicle cannot safely be driven on are soft sand or heavily rutted terrain. For a well-trained driver, having passed a driving standards test, this is generally a simple task as humans generally have excellent spatial awareness.

There are some cases where the driver of a vehicle may need, or would at least be beneficial to provide a driver aid which alerts the driver if they are approaching an object or surface which cannot be driven on. A common example of such a driver aid is a parking aid which may be fitted to a vehicle and which uses ultrasound to measure the distance between the vehicle and an object. An audible warning may then be issued if the driver is getting too close to the object, and in some cases a visual warning may also be issued. By fitting multiple sensors at spaced locations around the vehicle it is possible to provide a visual warning that shows the driver the approximate location of the object. These driver aids are relatively low cost and reliable but can only detect objects which will reflect a strong signal back towards the vehicle. They are of no use in helping the driver identify surfaces they should not drive onto.

Information on unsafe surfaces can be obtained by combining information about the location of a vehicle with an accurate map. However, this requires very detailed and up to date mapping and there are many documented instances of drivers blindly following directions from mapping apparatus to drive into unsafe areas.

In addition, advances in technology mean that autonomous vehicles are being developed which have no driver and rely on information captured by sensors fitted to the vehicle to determine where it is safe for the vehicle to move to. These sensors may comprise video cameras and radar apparatus, and perhaps also geolocation information such as global positioning (GPS) type signals.

It would therefore be desirable to provide a versatile apparatus and method of detecting regions of driveable space.

In the description the term driveable space is used to refer to a surfaces which vehicles normally drive on (e.g. safe surfaces such as road, carpark, driveways). The term Prohibited Space is used to define a region in a scene around a vehicle beyond where normal driveability ends. This may be an object such as a parked vehicle, or a wall, or a non-driveable surface such as a patch of long grass or rocky terrain.

According to a first aspect the invention provides a method of determining the characteristics of a scene around a vehicle, comprising capturing a first colour image of the scene, computing a set of histograms of oriented gradients, for instance using a HOG algorithm, each histogram corresponding to a cell in a set of cells, assigning an entropy value to the cell by computing the entropy of the histogram for the cell, dividing the image into bins in a way that corresponds to a rectangular grid in the real world, calculating an overall entropy value for each bin from the entropy values for the cells in the bin and an overall colour characteristic value for each bin, and feeding the entropy value and colour characteristic value for each bin into a classifier that is configured to identify whether the regions of the image corresponding to each bin is likely to be driveable space or is not likely to be driveable space.

By feeding the entropy value and colour characteristic value for each bin into a classifier the classifier in use classifies regions of the image corresponding to each bin as regions likely to be driveable space or that are not likely to be driveable space.

The step of calculating the colour characteristic for each bin may comprise calculating the colour saturation of each pixel associated with the bin and calculating the average of the colour saturations for the pixels to give the colour saturation value for the bin.

The colour characteristic may comprise the saturation or hue from the HSV colour space.

Each bin may be designed to be an approximation of a square or rectangular patch in a rectangular grid in the real world, projected into the image plane. Each bin may contain many cells. A bin may correspond to a patch in the real world of say 10 cm by 10 cm, or up to 30 cm by 30 cm or perhaps larger.

By entropy we mean the peakiness of the histogram. A suitable formulae for deriving an entropy value for each histogram is as follows:

$$H(X) = \sum_{i=1}^{n} P(x_i)I(x_i) = -\sum_{i=1}^{n} P(x_i)\log_b P(x_i),$$

The overall entropy value may be the mean of all the entropy values for each cell in a bin.

The HOG filter may be applied to the first colour image or an intermediate image derived from or a further image of the scene. It is convenient to use the same image used for saturation but within the scope of the invention to use a different image, for example obtained at a slightly later time or from a different image capture device, as long as the scene can be divided into the same grid of cells.

Each cell may comprise an array of 2×2, or 3×3, or 4×4 or higher pixels. The invention would work well if each cell is chosen to cover a region including preferably 4×4 or 8*8 pixels.

The cells may be arranged in an orthogonal grid covering the image, so that every pixel in the image appears in the cells, and each pixel is present in only one cell.

The classifier may comprise a probabilistic classifier that may be trained prior to the method being used on a set of images of driveable and non-driveable space.

The output of the classifier may be fed to a spatial filter that determines the boundary of a continuous region of driveable space extending from the host vehicle. Any bins that lie outside of this region may be presumed to be unreachable and may then be reclassified as non-driveable space. As such the method may comprise classifying each region as part of a reachable drivable space or non-reachable and hence non-driveable space.

Where a region in 3D space is classified as drivable or non-drivable, the corresponding portion of an image of that space may be classified similarly.

The method may therefore comprise a method of calculating the extent of a continuous region of driveable space around a vehicle visible in a captured image of a scene.

The output of the spatial filter may comprise a boundary edge in 3D space which represents the limit of driveable space that the vehicle can move into.

The step of spatial filtering may comprise recovering a continuous probability approximation over the region covered by the grid of bins. The grid may be arranged as columns and orthogonal rows and the step of recovering the continuous probability may comprise starting from a bin on the grid close to the host vehicle and working away from the host vehicle along one of the columns of the grid.

The method may use an alpha filter to smooth out any small patches of the image which appear undriveable but are surrounded by driveable areas.

The method may further comprise temporal filtering of the output of the classifier or the filter or filters to smooth the temporal behaviour of the classifier in order to avoid glitches.

The method may further comprise presenting an image of the environment to a driver and overlaying on the image information indicating the location of the boundary edge.

Alternatively the output of the spatial filter may be combined with information about the location of the vehicle and optionally the direction of travel of the vehicle to raise an alert as a function of the distance of the vehicle from the boundary. The distance may be measured in a direction of travel of the vehicle, or forward and rearward of the vehicle. This will ensure that alerts are not raised because the vehicle is close alongside a boundary yet cannot move in such a way as to hit the close boundary.

The method may be implemented by a processor that receives a feed from a video camera to form a normally-driveable space detector. In a second aspect, therefore the invention provides in combination a camera and a processor which is arranged to carry out the method steps of the first aspect of the invention, or processor that receives images from a feed from a camera.

The device may include a memory which stores program instructions that in use cause the processor to carry out the method of the first aspect.

The device may include a warning apparatus which receives an output signal from the processor and issues a warning where a vehicle is too close to a boundary. It may look at the distance between the front of the vehicle, or rear of the vehicle, or both, and the boundary. Of course, if boundaries at both the front and rear are required the device will need to receive a feed from a forward facing and a rearward facing camera.

The camera or cameras may capture images in the visible spectrum.

The method and device can be used with or additionally include visual sensors such as RGB cameras, infrared or night vision systems. This is used in combination with or to substitute other variety types of sensors (e.g. range sensors).

The detection is static in the sense that no dynamic model of the environment or the egomotion of the host platform is used to infer the possibility of an obstacle.

An example of the present invention will now be described with reference to the accompanying drawings of which:

Figure 1:
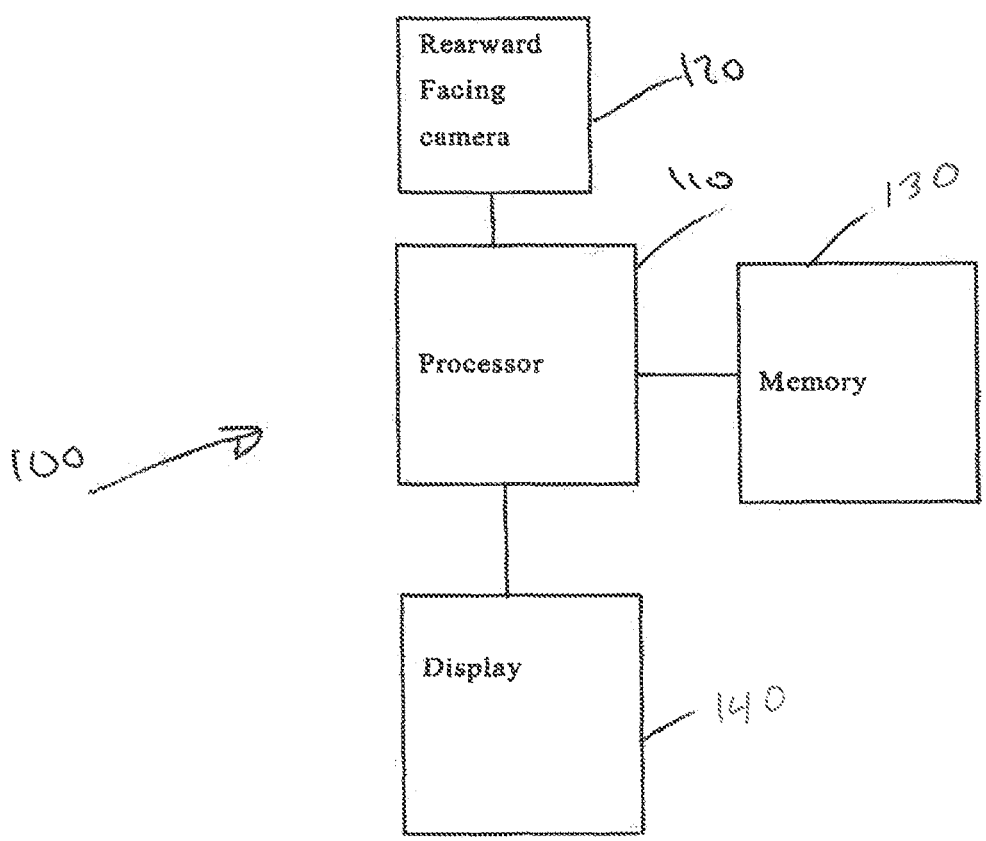
FIG. 1 is an overview of the key components of an embodiment of a driveable space detector in accordance with an aspect of the present invention.

FIG. 1 is an overview of an embodiment of a normally driveable space detector 100 which may be fitted to a vehicle. The main features of the detector are a processor 110 which receives a feed from a video camera 120 fitted to a host vehicle (not shown) such as a passenger car. The camera 120 faces rearwards in order to capture the scene to the rear of the vehicle which is hard for a driver to see, but could instead face forwards to help identify safe regions in front of the vehicle.

The camera 120 captures an image of a scene to the rear of the vehicle into which the vehicle could move, and will periodically capture fresh images every few seconds or fractions of a second. A memory stores 130 program instructions which cause the processor to process the images from the feed to determine a boundary of the driveable space. This memory 130 is also used to temporarily store the images that are being processed and intermediate images produced during the processing. The device in this example also includes a display 140 on which images can be presented to the driver of a vehicle. Of course, the camera and display could be omitted, with the processor being fed with a camera that forms part of another system, and likewise it may be sufficient simply to output data which can be fed to a display of another system or used for some other function.

Figure 2:
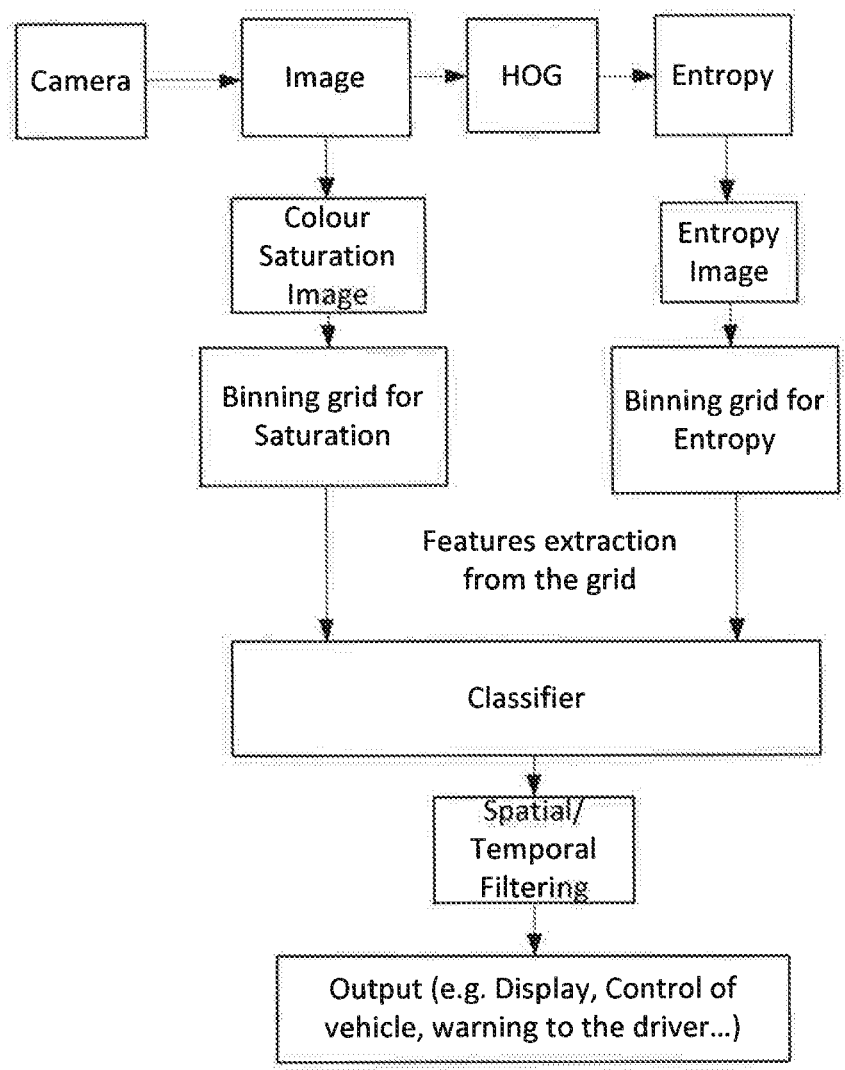
FIG. 2 shows a simple flow chart of the method steps of an embodiment of the invention.

FIG. 2 is a flowchart showing the steps performed by the processor when determining the location of the boundary.

The camera acquires an image frame which may be a colour or pseudo colour image. A histogram representation of the orientation of the gradients (e.g. using HOG) is computed for small cells in the image (typically, a 4×4 pixel cell). The output of the HOG is a histogram showing how often different edge orientations appear within the cell. A peaky histogram indicates mainly one orientation, a flat histogram shows many different orientations.

An entropy value is then computed from the histogram representing how peaky the histogram is or flat it is. It has been observed by the applicant that a cell containing prohibited space (e.g. a car) has a different entropy of edge orientation than a cell that is normally driveable space.

This entropy is then accumulated for a grid of bins. A bin is a group of pixels. Cells are a subdivision of the image for the purposes of computing the HOG. Bins are a subdivision of the image corresponding to a real-world rectangular grid. This gives the first set of features used as an input to the classifier stage.

Figure 3:
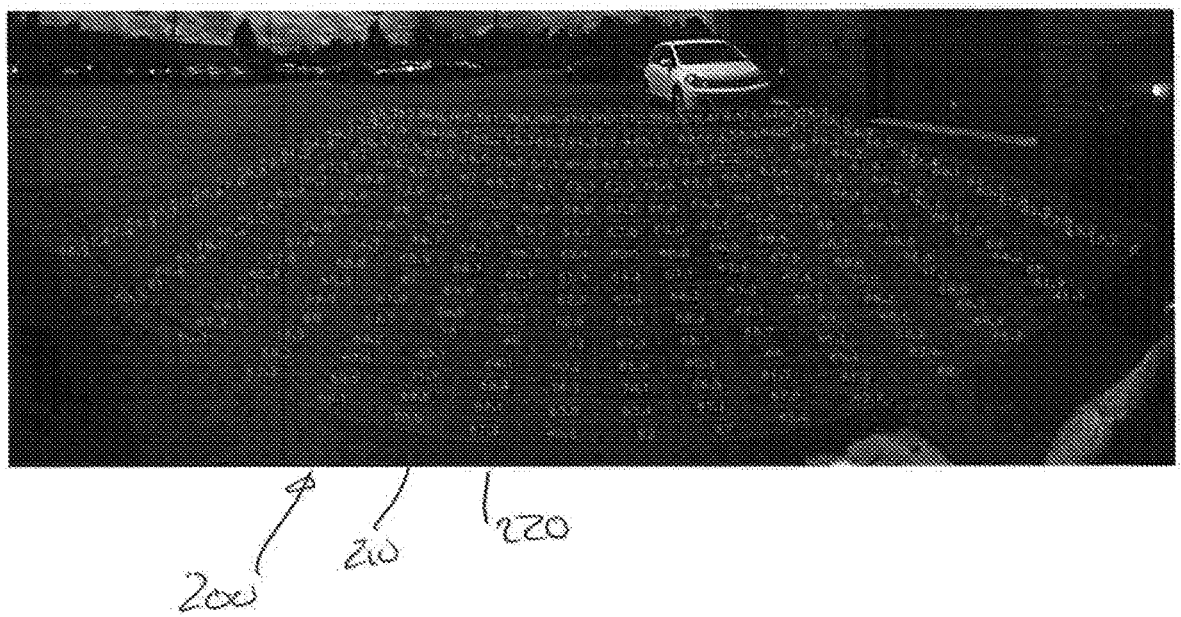
FIG. 3 illustrates the division of the scene into bins and the assignment of entropy value to each bin.

An example of the grid 200 is shown in FIG. 3 with the numbers 210 in each bin 220 representing the entropy within each image patch bin overlaid.

In parallel, a colour characteristic (such as colour saturation) of the image is retrieved from the processed camera-frame. This is accumulated over the same grid of cells, creating a second set of features for the classifier. Each bin in the grid is assigned a single colour value.

Colour saturation in the image gives information on the presence of bright intense colours in the captured camera-frame, which have been shown to be a differentiator between drivable and non-driveable surfaces that are related to the presence of a prohibited surface or not. The colour saturation is accumulated over the same grid, creating a second set of features for the classifier. It is envisaged that other colour characteristics could be used in the same way as colour saturation.

A probabilistic classifier, extensively trained to determine differences in the sets of features, is then used to discriminate between "driveable" and "prohibited" giving as output the "probability of normal driveability" of a region of the image.

An example of a suitable classifier that may be trained is described in the book titled Artificial Intelligence: A Modern Approach by Peter Norvik and Stuart Russel, 2nd edition, page 718.

The method may therefore be summarised as follows:

Step 1: Compute a two dimensional matrix of histograms of oriented gradients using the established HOG algorithm, from the original image. The basic operation of the HOG Algorithm itself being summarised as: The image is subdivided into cells (typically 4*4 or 8*8 in size) and a gradient histogram is calculated for each of these cells. Cell histograms are aggregated into histograms of larger overlapping regions of the image. Thus, the final matrix of histograms may be of a smaller size than the original image.

Step 2: Calculate an entropy value from each histogram in the matrix using a suitable formulae Step 3: Define a set of bins as a grid in the real world. The value for each bin is the average of the entropies of the histograms contained in it along with the average of the colour saturations of the corresponding pixels.

Spatial filtering is then used to recover a continuous probability approximation from the output of the classifier over the region of interest covered by the grid. This involves starting from a cell on the grid close to the host vehicle and working away from the car along one of the columns of the grid. A standard alpha filter can be used to smooth out any small patches of road which appear undriveable but are surrounded by driveable areas.

Finally, temporal filtering is used to smooth the temporal behaviour of the classifier in order to avoid glitches and therefore false detections of prohibited spaces to produce an output which is easier for the human eye to interpret. If this system were to form part of a control system, this stage would not be performed as the control system would be expected to perform whatever filtering was necessary.

Figure 4:
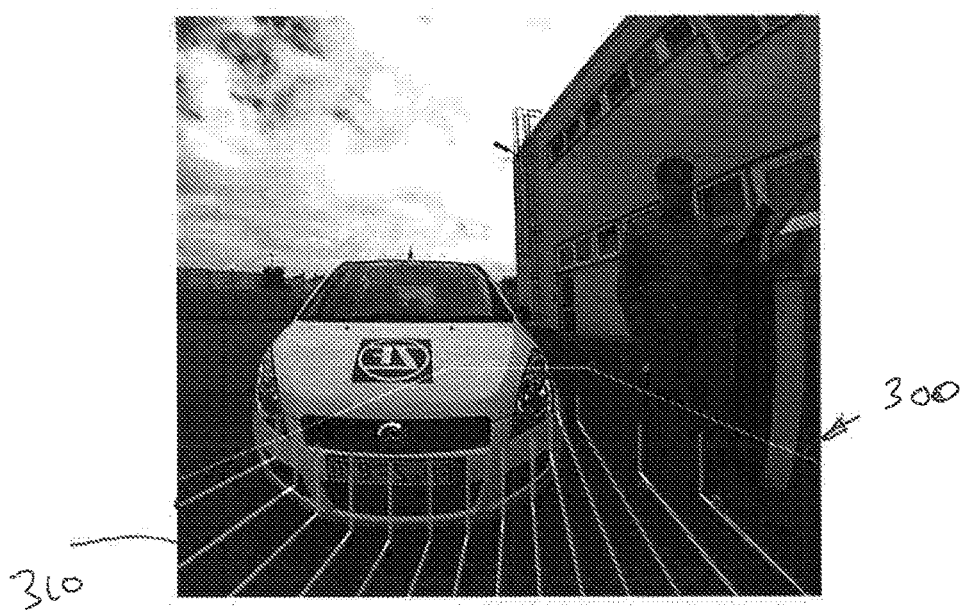
FIG. 4 shows the display of the boundary of the driveable space on the display.

One way to display the information to a human is in the form of a display such as the one shown in FIG. 4. This example shows the display of a composite image made up from the camera image and an overlay of the boundary of driveable space 310 to prohibited space in a simple format that would help a driver of the vehicle to aid reversing the vehicle.

The invention claimed is:

1. A method of determining the characteristics of a scene around a vehicle, comprising:
   capturing a first colour image of the scene,
   computing a set of histograms of oriented gradients, for instance using a HOG algorithm, each histogram corresponding to a cell in a set of cells,
   assigning an entropy value to the cell by computing the entropy of the histogram for the cell,
   dividing the image into bins in a way that corresponds to a rectangular grid in the real world,
   calculating an overall entropy value for each bin from the entropy values for the cells in the bin and an overall colour characteristic value for each bin, and
   feeding the entropy value and colour characteristic value for each bin into a classifier that is configured to classify regions of the image corresponding to each bin as regions likely to be driveable space or that are not likely to be driveable space.

2. A method according to claim 1 in which the colour characteristic comprises the saturation or hue from the HSV colour space.

3. A method according to claim 1, in which each bin is an approximation of a square or rectangular patch in a rectangular grid in the real world, projected into the image plane.

4. A method according to claim 1, in which the classifier comprises a probabilistic classifier that has been trained prior to the method being used on a set of images of driveable and non-driveable space.

5. A method according to claim 4, in which the output of the classifier is fed to a spatial filter that determines the boundary of a continuous region of driveable space extending from the host vehicle.

6. A method according to claim 5, in which the step of spatial filtering comprises recovering a continuous probability approximation over the region covered by the grid of bins.

7. A method according to claim 6, in which the grid is arranged as columns and orthogonal rows and the step of recovering the continuous probability comprises starting from a bin on the grid close to the host vehicle and working away from the host vehicle along one of the columns of the grid, and repeating for each column.

8. A method according to claim 5, which further comprises presenting an image of the environment to a driver and overlaying on the image information indicating the location of the boundary edge.

9. Apparatus comprising a processor which is arranged to carry out the method steps of claim 1, the first aspect of the invention, or processor that receives images from a feed from a camera.

\* \* \* \* \*